United States Patent
Sylvain (10) Patent No.: US 8,638,918 B2
(45) Date of Patent: *Jan. 28, 2014

(54) SOURCE SELECTION FOR CONFERENCE BRIDGES

(75) Inventor: Dany Sylvain, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 263 days.

This patent is subject to a terminal disclaimer.

(21) Appl. No.: 13/152,529

(22) Filed: Jun. 3, 2011

(65) Prior Publication Data

US 2011/0234745 A1     Sep. 29, 2011

Related U.S. Application Data

(63) Continuation of application No. 11/553,750, filed on Oct. 27, 2006, now Pat. No. 7,957,512.

(51) Int. Cl.
*H04M 3/42* (2006.01)

(52) U.S. Cl.
USPC .................................. 379/202.01; 379/201.01

(58) Field of Classification Search
USPC .......................... 379/202.01, 201.01; 709/204
See application file for complete search history.

(56) References Cited

U.S. PATENT DOCUMENTS

| | | | |
|---|---|---|---|
| 5,548,638 A | 8/1996 | Yamaguchi et al. | |
| 7,586,513 B2 * | 9/2009 | Muren et al. | 348/14.01 |
| 7,668,907 B1 | 2/2010 | Janakiraman et al. | |

FOREIGN PATENT DOCUMENTS

| | | |
|---|---|---|
| EP | 1246442 A2 | 10/2002 |
| EP | 1549035 A1 | 6/2005 |
| WO | 02089458 A1 | 11/2002 |

OTHER PUBLICATIONS

European Search Report for EP 07394026.4 completed Feb. 15, 2008. 2 pages.
Non-Final Rejection mailed Aug. 17, 2010, for U.S. Appl. No, 11/553,750. 10 pages.
Notice of Allowance mailed Jan. 28, 2011, for U.S. Appl. No. 11/553,760, 4 pages.

* cited by examiner

*Primary Examiner* — Thjuan K Addy
(74) *Attorney, Agent, or Firm* — Withrow & Terranova, PLLC (57) ABSTRACT

The present invention provides an audio source selection process for a conference bridge. The conference bridge receives multiple audio sources and selects at least one of the audio sources based on the relative signal levels associated with the audio signal at each of the audio sources. The audio signals associated with the selected source are delivered to conference participants via one or more audio outputs. The conference bridge will repeatedly employ a selection process to select an audio source based on signal level measurements for the audio signals of the audio sources. During the selection process, the influence of a selected audio source relative to the other unselected audio sources is reduced, after the selected audio source has remained selected for more than a first time period.

32 Claims, 6 Drawing Sheets

FIG. 5

SOURCE SELECTION FOR CONFERENCE BRIDGES

RELATED APPLICATIONS

The present application is a continuation of co-pending U.S. patent application Ser. No. 11/553,750, filed Oct. 27, 2006, entitled "SOURCE SELECTION FOR CONFERENCE BRIDGES."

FIELD OF THE INVENTION

The present invention relates to conference bridges, and in particular to selecting audio sources during a conference call.

BACKGROUND OF THE INVENTION

Conference bridges are used to facilitate conference calls between two or more conference participants. In operation, multiple calls from multiple communication devices are terminated at a conference bridge. The audio levels for the audio signals from the different communication devices are monitored and used to identify a particular one of the audio signals to provide as an output to the communication devices. In general, the communication terminal providing the audio signal having the highest level at any given time is selected as the selected communication terminal. The audio signal from the selected communication terminal is provided to the communication devices in the conference. The audio signals from the unselected communication terminals are not provided to the communication devices. Only the audio signal provided by the selected communication terminal is presented to the other unselected communication terminals. As such, none of the participants will hear any participants other than those using the selected communication terminal. To avoid distractions, the audio signal from the selected communication terminal is generally not provided back to the selected communication terminal.

Since conference bridges generally select the audio signals from the loudest participant to present to other participants, there are many situations where other participants are contending for conference time to no avail. If those participants contending for conference time do not present audio signals at a level higher than the participant using the currently selected communication terminal, they will never be selected as the selected participant. This situation is problematic for soft-spoken participants as well as participants in a conference with a relatively active and loud participant. In many instances, a louder participant may gain conference access and maintain conference access for extended periods of time, even though other participants are contending for conference access.

Further, conference calls are being employed in more diverse applications. For instance, on-line gaming groups are employing conference calls to allow multiple gamers from different locations to talk with each other during a gaming session. Given the excitement and potential for significant background music or other noise, those gamers with the louder group or environment may dominate the conference simply due to the selection process used by the conference bridge hosting the conference call. Again, the louder participants may gain conference access and maintain conferences access for extended periods of time, even though other participants want conference access.

Accordingly, there is a need for a conference bridge that provides greater conference access to those participants who are contending for conference time against louder participants or participants in relatively noisy environments. There is a further need to ensure that louder participants or participants in noisy environments do not maintain conference access for extended periods of time when other participants are contending for conference access.

SUMMARY OF THE INVENTION

The present invention provides an audio source selection process for a conference bridge. The conference bridge receives multiple audio sources and selects at least one of the audio sources based on the relative signal levels associated with the audio signal at each of the audio sources. The audio signals associated with the selected source are delivered to conference participants via one or more audio outputs. Each audio source is associated with an audio output to facilitate bidirectional communications for each conference participant. Further, the audio signals of the selected audio source are generally not delivered via an audio output corresponding to the selected audio source. The conference bridge will repeatedly employ a selection process to select an audio source based on signal level measurements for the audio signals of the audio sources. During the selection process, the influence of a selected audio source relative to the unselected audio sources is reduced, after the selected audio source has remained selected for more than a first time period. By reducing the relative influence of the selected audio source after a certain period of time, the likelihood of selecting another audio source that is contending for selection increases.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a unique audio source selection process for a conference bridge. The conference bridge receives multiple audio sources and selects at least one of the audio sources based on the relative signal levels associated with the audio signal at each of the audio sources. The audio signals associated with the selected source are delivered to conference participants via one or more audio outputs. Each audio source is associated with an audio output to facilitate bidirectional communications for each conference participant. Further, the audio signals of the selected audio source are generally not delivered via an audio output corresponding to the selected audio source. The conference bridge will repeatedly employ a selection process to select an audio source based on signal level measurements for the audio signals of the audio sources. During the selection process, the influence of a selected audio source relative to the unselected audio sources is reduced, after the selected audio source has remained selected for more than a first time period. By reducing the relative influence of the selected audio source after a certain period of time, the likelihood of selecting another audio source that is contending for selection increases.

During the first time period, each of the audio sources generally competes equally for selection. The influence of the selected audio source relative to the unselected audio sources may be continually reduced after the first time period, if the selected audio source remains selected. A further reduction may be employed for each selection iteration or after a defined number of selection iterations. Reduction of the influence of the selected audio source relative to the unselected audio sources may continue indefinitely or stop at a defined level. Alternatively, the influence of the selected audio source relative to the unselected audio sources may be reduced by a single step or by successive steps during subsequent time periods, if the selected audio source remains selected for more than a first time period. Once reduced, the influence of the selected audio source relative to the unselected audio source may remain reduced for a set period of time after another audio source is selected.

To reduce the influence of the selected audio source relative to the unselected audio sources, a weighting factor may be used to reduce a signal level measurement of the selected audio source for the selection process. Alternatively, weighting factors may be applied to increase the signal level measurements of the selected audio sources. After a source has remained selected for the first time period, the weighting factors may be adjusted after each iteration or number of iterations for the selection process to reduce the influence of the signal level measurements of the selected source relative to the signal level measurements of the unselected sources. For video conferencing applications, the selection process provided for the audio portion of the conference may be used to select a video source.

Figure 1:
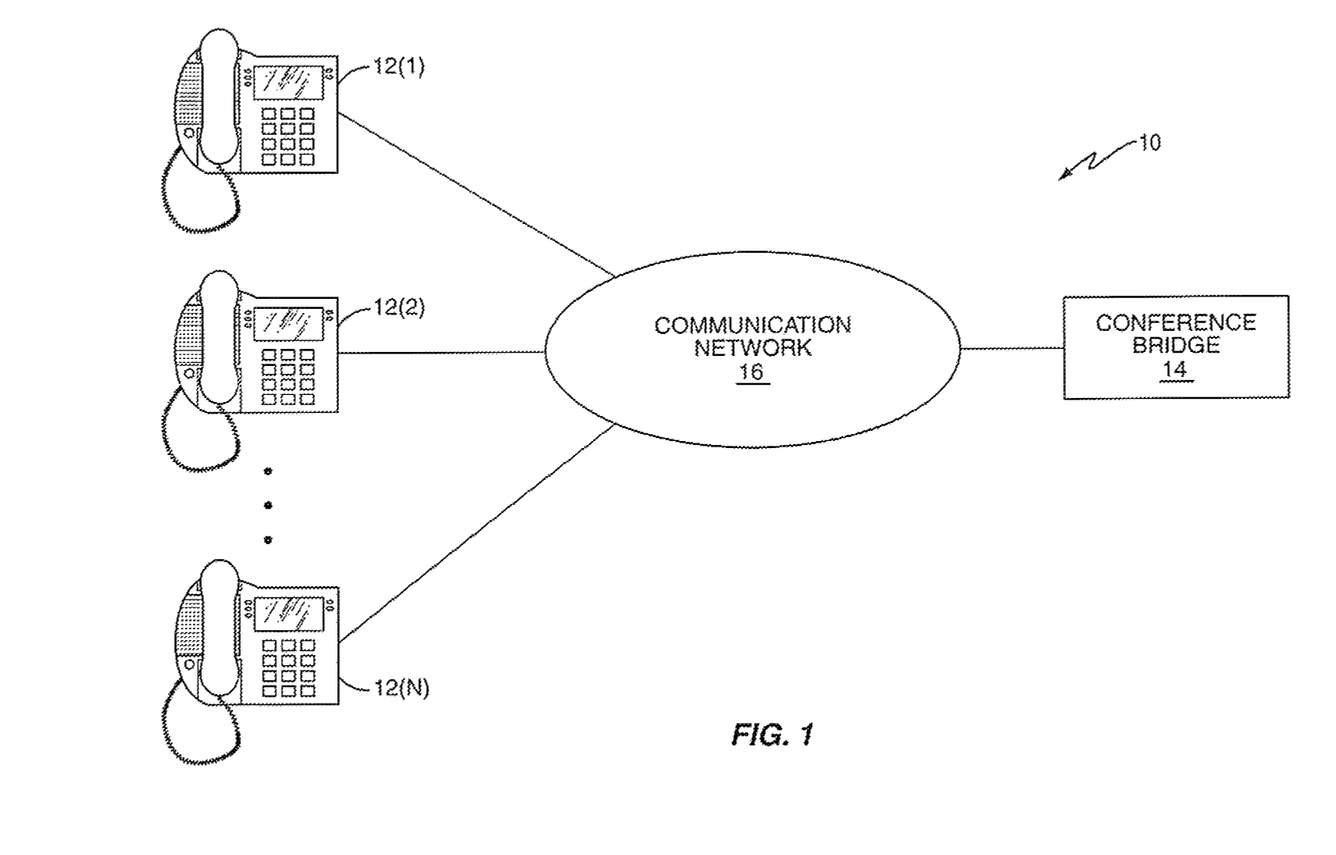
FIG. 1 is a block representation of a communication environment according to one embodiment of the present invention.

Prior to delving into the details of the present invention, an overview of a conference environment 10 is provided in association with FIG. 1. As illustrated, any number of communication terminals 12 (1-N) may call into a conference bridge 14 over a communication network 16 to facilitate a conference call among the various users associated with the communication terminals 12. Typically, the conference bridge 14 will select one of the communication terminals 12 as a selected communication terminal 12, and deliver the audio received from the selected communication terminal 12 to the remaining communication terminals 12 participating in the conference call. For example, if communication terminal 12(1) was selected as the selected communication terminal 12, the audio signal received from communication terminal 12(1) is provided to the other communication terminals 12(2-N), assuming that communication terminals (1-N) are participating in the conference call. Generally, the audio received from the selected communication terminal 12(1) is not provided back to the selected communication terminal 12(1) to avoid distracting the conference participant associated with the selected communication terminal 12(1).

Figure 2:
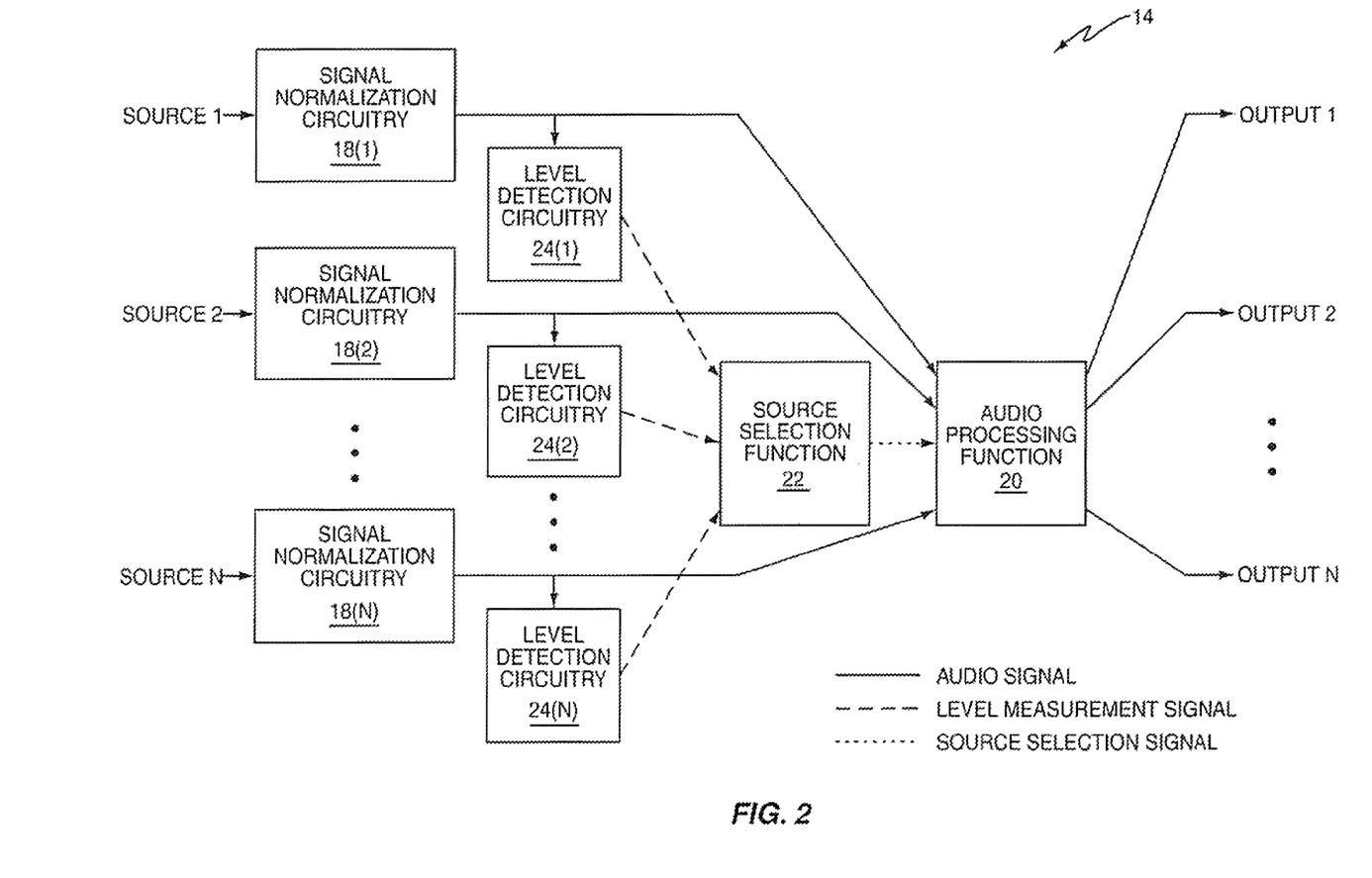
FIG. 2 is a block representation of a conference bridge according to one embodiment of the present invention.

The present invention provides a selection process for selecting the selected communication terminal 12 from the participating communication terminals 12(1-N). An overview of a basic selection process is provided in association with the description of the architecture of a conference bridge 14, which is illustrated in FIG. 2. As depicted, audio signals from the various communication terminals 12(1-N) are ultimately received by the conference bridge 14 as sources 1-N, respectively. The audio signals provided to the communication terminals 12(1-N) are represented as outputs 1-N, respectively. As such, source N and output N provide bidirectional communications for communication terminal 12(N).

During operation, audio signals from the various communication terminals 12(1-N) are received as sources 1-N and processed by signal normalization circuitry 18(1-N). The signal normalization circuitry 18, may operate on the various audio signals to provide a normalized signal level among the conference participants, such that the relative volume associated with each of the conference participants during the conference call is substantially normalized to a given level. The signal normalization circuitry 18 is optional, but normally employed in conference bridges 14. After normalization, the audio signals from the various sources 1-N are sent to an audio processing function 20. A source selection function 22 is used to select one of the sources 1-N as a selected source, and provide a corresponding source selection signal to the audio processing function 20. In response to the source selection signal, the audio processing function 20 will deliver the audio signal for the selected source (1-N) over all of the outputs, except for the output associated with the selected source. If source N is the selected source, the audio processing function 20 will provide the audio signal from source N to outputs 1 through N−1. The audio signals from the non-selected sources 1 through N−1 is dropped, and therefore not presented to any of the outputs 1-N, in traditional fashion.

In general, the source providing the audio signal having the greatest magnitude is selected. The source selection function 22 will continuously monitor the relative magnitudes of the audio signals at each of the sources 1-N, and select a source throughout the conference call. As such, the source selection function 22 will select different ones of the sources 1-N throughout the conference call.

After normalization by the signal normalization circuitry 18(1-N), the audio signals for sources 1-N are provided to corresponding level detection circuitry 24(1-N). Each level detection circuitry 24 will process a corresponding audio signal to generate a level measurement signal, which is presented to the source selection function 22. The level measurement signal corresponds to a relative magnitude of the audio signal for a given source. The level detection circuitry 24 may employ different techniques to generate a corresponding level measurement signal. In one embodiment, a power level derived from a running average of a given audio signal or an average power level of an audio signal over a given period of time is generated and represents the level measurement signal, which is provided by the level detection circuitry 24 to the source selection function 22. The source selection function 22 will continuously monitor the level measurement signals from the various level detection circuitry 24(1-N) and select one of the sources 1-N as a selected source based thereon. As noted, the source selection function 22 will then-provide a source selection signal to identify the selected source to the audio processing function 20, which will deliver the audio for the selected source over the outputs associated with the unselected sources. The output corresponding to the selected source may not be provided with an audio signal from the selected source.

The present invention lies in the selection process for determining the selected source. In general, the selection process provided by the source selection function 22 operates to reduce the influence of the selected source relative to the unselected sources after the selected source has remained selected for a first time period. Reducing the influence of the selected source relative to the unselected sources increases the likelihood that an unselected source contending for selection will be selected, even if the signal levels of the selected source remain at levels higher than those of the source contending for selection. Therefore, conference participants that tend to speak more softly than other conference participants, or are in quieter overall environments, are given a greater chance to participate in the conference. In other words, conference participants who speak more loudly or are located in a noisier environment will not dominate the conference simply because of their relative volume.

Figure 3A:
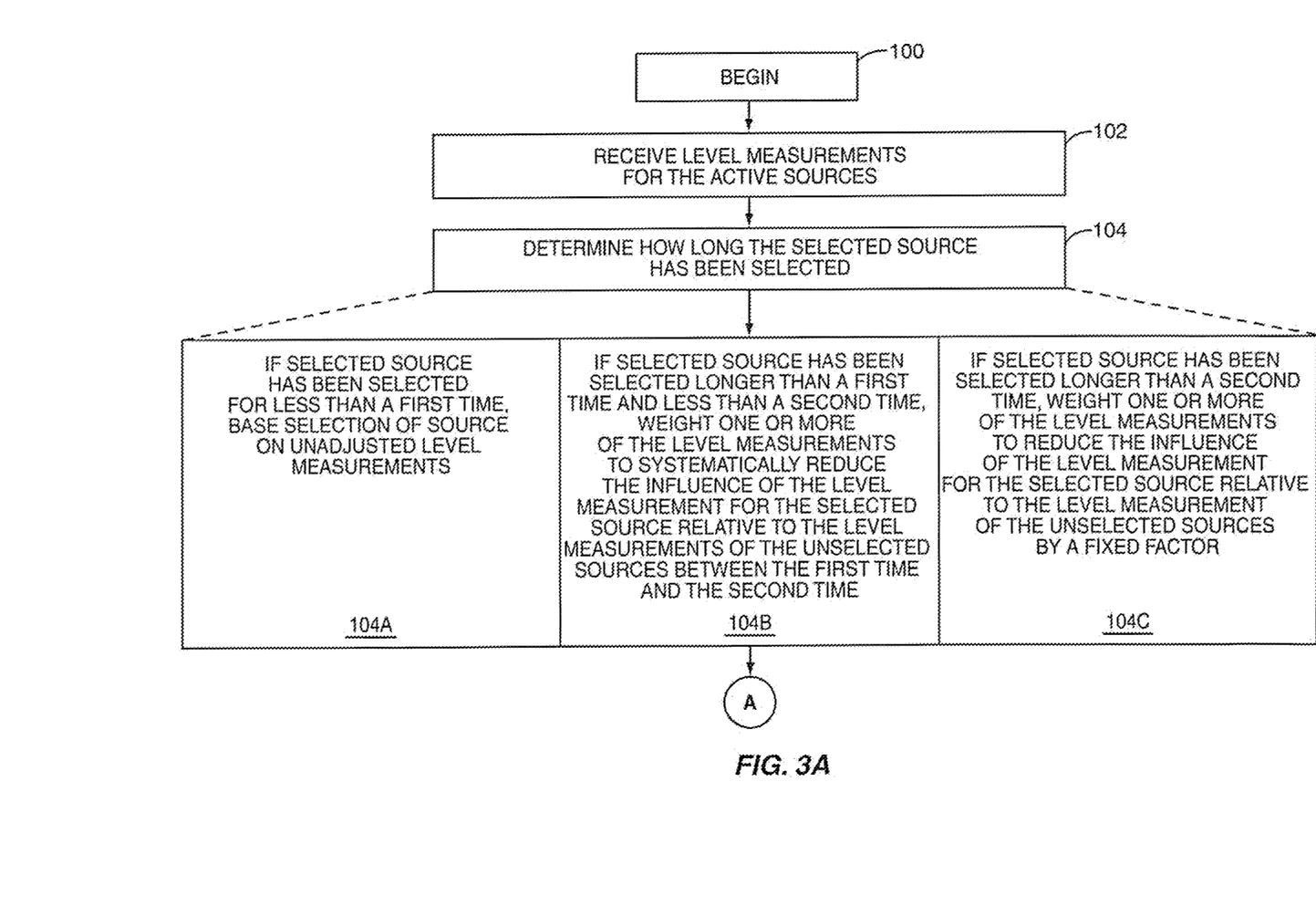
FIGS. 3A and 3B provide a flow diagram illustrating operation of a conference bridge according to one embodiment of the present invention.
Figure 3B:
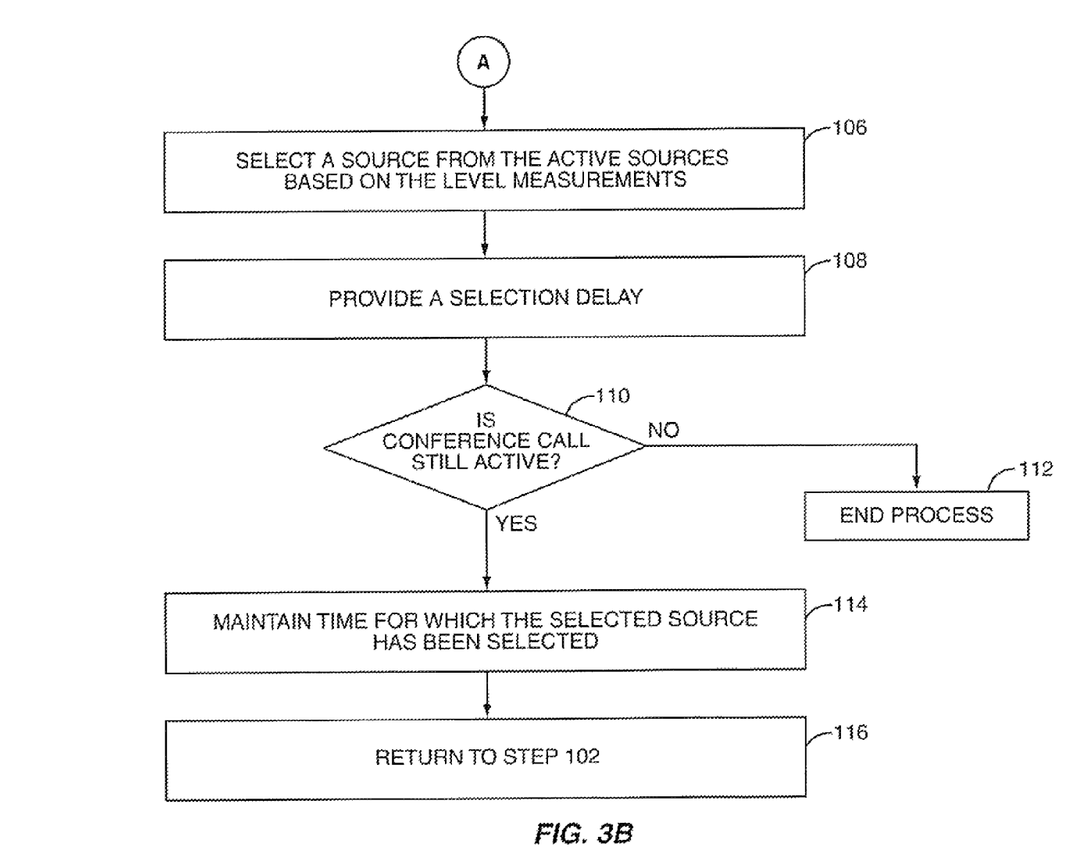

With reference to FIGS. 3A and 3B, the source selection function 22 will begin a source selection process (step 100) by receiving level measurements associated with the audio signals for the active sources 1-N (step 102). The level measurements may be received via the level measurement signals provided by the level detection circuitry 24(1-N), which monitors the audio signals of the sources 1-N and provide corresponding level measurement signals to the source selection function 22. The source selection function 22 will substantially continuously receive level measurements for the sources.

The source selection function 22 will then determine how long the selected source has been selected, assuming that the process has run before and a selected source has been selected from the active sources (step 104). The level measurements may be used as is, or weighted versions of the level measurements may be used, as will be described below.

If the selected source has been selected for less than a first time, the determination of the selected source will be based on unadjusted, or unweighted, level measurements (step 104A). As such, the source selection function 22 will select a source from the active sources based on the level measurements, which are essentially the level measurements (step 106). As such, none of the sources are prioritized with respect to another during the source selection process.

If the selected source has been selected between a first time and a second time, the influence of the selected source is reduced relative to the influence of the unselected sources. For example, if the selected source has been selected between a first time and a second time period, one or more of the level measurements are weighted to systematically reduce the influence of the level measurement for the selected source relative to the level measurements of the unselected sources between the first time and the second time (step 104B). To inject such influence, the level measurement of the selected source may be reduced by a weighting factor. Alternatively, the level measurements for the unselected sources may be increased by a weighting factor. Those skilled in the art will recognize various techniques for reducing the influence of the selected source relative to the unselected sources during the source selection process. Once the weighting is applied to one or more of the level measurements, one of the sources is chosen as the selected source based on the level measurements (step 106).

Between the first time and the second time, the relative influence of the selected source on the source selection process may continually decline with each source selection iteration. Alternatively, the influence may be continually reduced in a stepwise fashion after a select number of iterations throughout the period between the first and second times. Further, the influence may be reduced once or any number of times between the first and second times.

If the selected source has been selected longer than the second time, one or more of the level measurements are weighted to reduce the influence of the level measurement for the selected source relative to the level measurements of the unselected sources by a fixed factor (step 104C). As such, the reduction of the influence of the selected source relative to the unselected sources during the selection process may stop after a certain period of time or amount of reduction has been reached. Again, once the level measurements have been determined from weighting one or more of the level measurements, the source selection function 22 may select a source based on the level measurements (step 106).

After a source has been selected, a selection delay may be provided (step 108) and the process will repeat if the conference call remains selected. As such, the source selection function 22 will determine if the conference call is still selected (step 110), and if the call is no longer active the source selection process will end (step 112). If the conference call is still active (step 110), the source selection function 22 will maintain a time for which the selected source has been selected (step 114), and repeat the process by returning to step 102 (step 116).

The source selection process will run in a substantially continuous fashion. For example, the selection process may repeat every 5-10 ms. However, the time that a source has been selected is maintained from one iteration to the next. If the selected source has remained selected for a certain period of time, which will encompass multiple source selection iterations, steps are taken to reduce the influence of the selected source with respect to the unselected sources in an effort to increase a likelihood of an unselected source that is contending for selection being selected after the first time period.

Those skilled in the art will recognize that the process described above is merely exemplary, and that the reduction of influence for an selected source in the source selection process may take many forms. For example, the reduction may employ a single reduction, wherein the extent of the reduction increases over time. Further, the amount of reduction need not level off after the second time.

Figure 4:
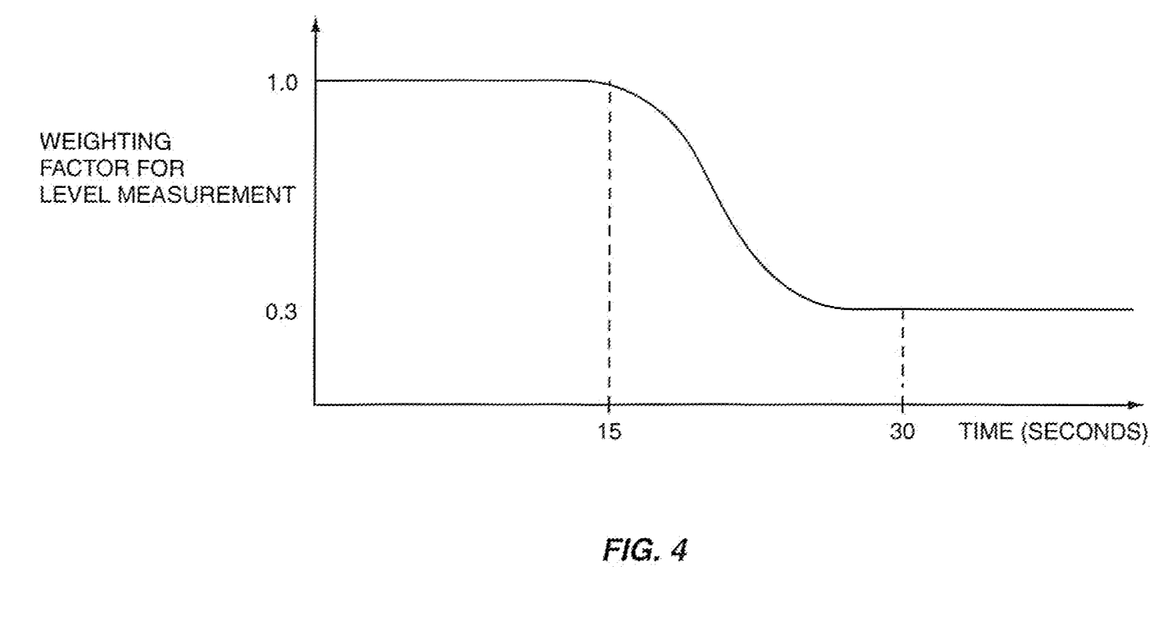
FIG. 4 is a graph providing an exemplary weighting factor to apply to level measurements associated with sources that have been selected for more than a first time period.

With reference to FIG. 4, a chart is provided to illustrate the weighting factors to provide to a selection level measurement for a selected source when the source remains selected for more than 30 seconds. When the selected source has been selected for less than 15 seconds, all of the sources will contend equally for selection. When the selected source has been selected for more than 15 seconds but less than 30 seconds, the weighting factor applied to the level measurement for the selected source gradually declines, such that the selected source is given less priority with respect to the unselected sources during the source selection process. After 30 seconds of being selected as the selected source, the weighting factor for the level measurement of the selected source is fixed, and will remain so until another source is selected. Notably, after the influence of the selected source is reduced relative to the unselected sources, the influence reduction may remain in whole or may be progressively eliminated over a period of time after another source is selected. This will prevent the formerly selected source from regaining selected source status too quickly.

Figure 5:
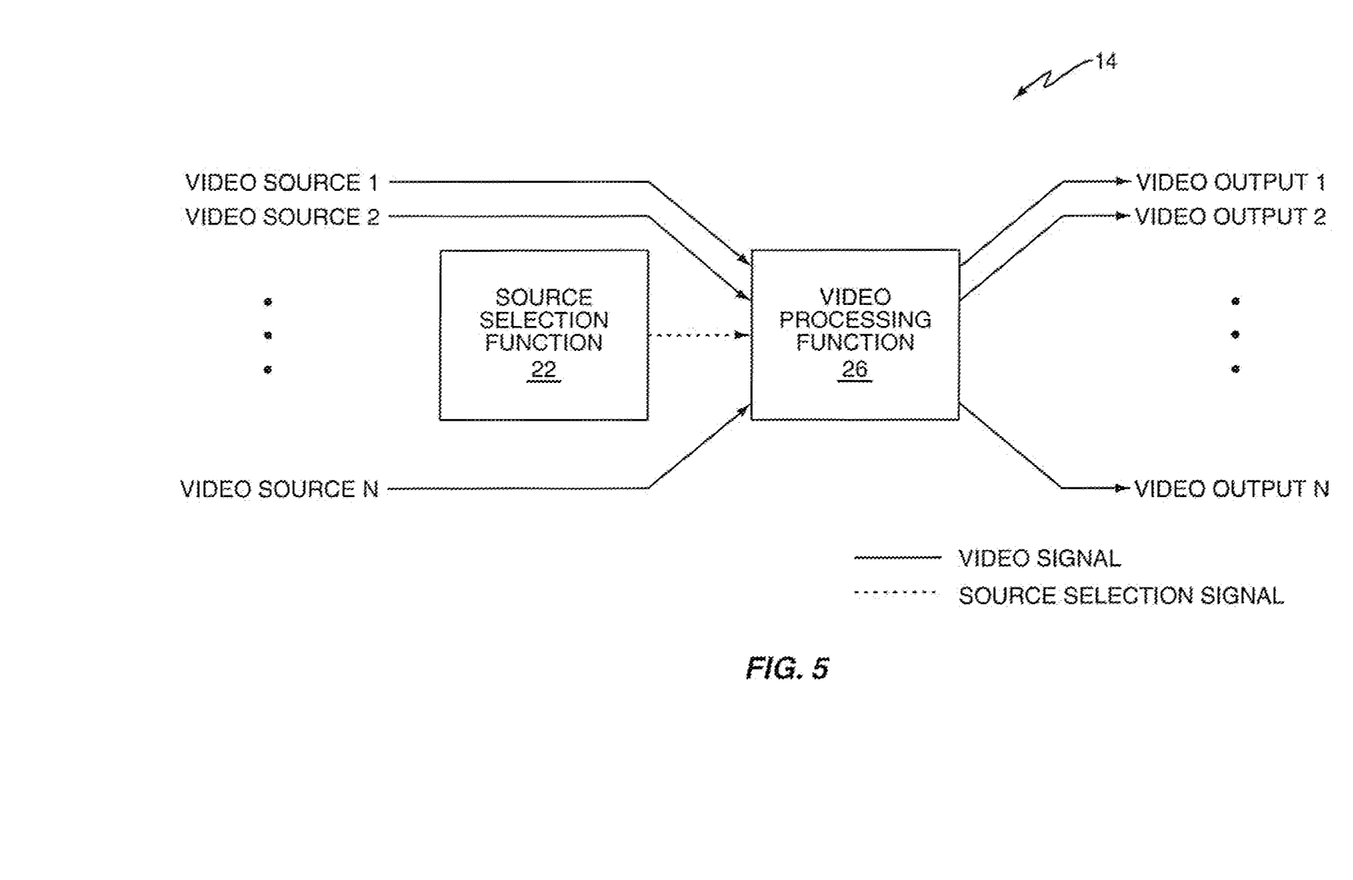
FIG. 5 is a block representation of a video bridge portion of a conference bridge according to one embodiment of the present invention.

With reference to FIG. 5, the audio bridge 14 may be used to select video sources when a video conferencing function is available. In many instances, the video source selection will track that of the audio source selection. As such, a video processing function 26 may be provided, where video sources 1-N correspond to sources 1-N. Further, each video source 1-N will be associated with a video output 1-N. The video processing function 26 will receive video signals from the video sources 1-N, and provide a video signal for a selected one of the video sources 1-N to each of the video outputs 1-N. The video signals for the unselected video sources may be dropped or processed in an appropriate video conferencing fashion. For the present invention, the source selection function 22 of the audio bridge 14 may use the source selection process described above to provide a source selection signal to the video processing function 26. Notably, the video source selection may be based on the audio signals from the sources 1-N of the audio bridge 14, and as such, will select the video source corresponding to the selected audio source.

Although the above embodiments focus on selecting a single source at any given time during a conference call, multiple sources may be selected at the same time. The corresponding audio signals for the selected sources may be mixed and provided to each of the outputs associated with the unselected sources. The audio signal for one selected source may be provided over the output of the other selected sources, such that participants associated with the multiple selected sources can hear each other, but preferably not themselves. The selection process described above is equally applicable when multiple sources are selected.

Those skilled in the art will recognize improvements and modifications to the preferred embodiments of the present invention. All such improvements and modifications are considered within the scope of the concepts disclosed herein and the claims that follow.

What is claimed is:

1. A method for providing source selection for an audio conference, comprising:
   receiving information characterizing at least one audio source for a conference call;
   determining how long a selected source has been a selected source;
   when the selected source has been selected for longer than a first time period, weighting the information characterizing the selected sources to reduce an influence of information characterizing the selected source relative to information characterizing at least one unselected source;
   newly selecting a source from the plurality of sources based on the information characterizing the sources and the weighting of the information characterizing the selected sources;
   providing at least one audio signal for the newly selected source to at least one output for the conference call.

2. The method of claim 1, wherein the step of selecting at least one selected source comprises selecting a plurality of selected sources.

3. The method of claim 1, wherein the information characterizing at least one audio source comprises information characterizing an audio signal from the audio source.

4. The method of claim 3, wherein the information characterizing at least one audio signal comprises at least one audio level measurement.

5. The method of claim 4, wherein weighting the information characterizing at least one source comprises decreasing the level measurement for that source by a weighting factor.

6. The method of claim 4, wherein weighting the information characterizing at least one source comprises increasing the level measurement for at least one unselected source by at least one weighting factor.

7. The method of claim 1, wherein the influence of the information characterizing the at least one selected source relative to the information characterizing unselected sources is continually reduced after the first time period.

8. The method of claim 1, wherein the influence of the information characterizing the at least one selected source relative to the information characterizing at least one unselected source is reduced after the first time period as long as the at least one selected source is a selected source.

9. The method of claim 1, wherein the influence of the information characterizing the at least one selected source relative to the information characterizing the at least one unselected source is continually reduced after the first time period as long at the at least one selected source is a selected source.

10. The method of claim 1, wherein the influence of the information characterizing the at least one selected source relative to the information characterizing the at least one unselected source is continually reduced during a defined period after the first time period.

11. The method of claim 7, wherein the influence of the information characterizing the at least one selected source relative to the information characterizing the at least one unselected source is not further reduced after the defined period.

12. The method of claim 1, wherein the influence of the information characterizing the at least one selected source relative to the information characterizing the at least one unselected source remains reduced for a defined period after the at least one selected source becomes an unselected source.

13. The method of claim 1, comprising:
   selecting at least one selected video source from a plurality of video sources associated with the plurality of sources based on the information characterizing at least one audio source and the weighting of the information characterizing at least one of the audio sources; and
   providing at least one video signal from the at least one selected video source to at least one video output for the conference call.

14. The method of claim 1, wherein the audio conference is part of an online gaming session.

15. The method of claim 1, wherein the steps of selecting sources and providing audio signals are performed separately for each of a plurality of outputs so that different participants receive different selections of audio signals.

16. The method of claim 15, wherein each participant receives a selection of audio signals that does not include an audio signal from the source associated with that participant.

17. The method of claim 1, wherein, when a plurality of sources have been selected, the method comprises weighting information characterizing the selected sources individually based on respective lengths of time for which each selected source has been selected.

18. A system, comprising:
   a plurality of input ports through which audio signals from a plurality of audio sources are received for a conference call;
   an audio source characterization element operable to receive the audio signals from the plurality of input ports and to generate information characterizing the audio sources based on their respective audio signals;

a source selection element operable to:
receive the information characterizing the audio sources;
determine how long a selected audio source has been selected;
when the selected audio source has been selected for longer than a first time period, weight the information characterizing the selected audio sources to reduce an influence of information characterizing the selected audio source relative to information characterizing remaining ones of the plurality of audio sources;
select a newly selected audio source based on the information characterizig the audio sources and the weighting of the information characterizing the selected audio source; and
effect delivery of at least one audio signal for the newly selected audio source to at least one output port for the conference call.

19. The system of claim 18, wherein the source selection element is operable to select a plurality of selected sources.

20. The system of claim 18, wherein the audio source characterization element is operable to make at least one audio level measurement characterizing at least one of the audio sources.

21. The system of claim 20, wherein the source selection element is operable to weight the level measurement for the at least one source by decreasing a weighting of the information by a weighting factor.

22. The system of claim 20, wherein the source selection element is operable to weight the level measurement for the at least one source by increasing the level measurement for at least one unselected source by at least one weighting factor.

23. The system of claim 18, wherein the source selection element is operable to reduce the influence of the information characterizing the at least one selected input port relative to the information characterizing unselected sources continually after the first time period.

24. The system of claim 18, wherein the source selection element is operable to reduce the influence of the information characterizing the at least one selected input port relative to the information characterizing at least one unselected input port after the first time period as long as the at least one selected input port is a selected input port.

25. The system of claim 18, wherein the source selection element is operable to reduce the influence of the information characterizing the at least one selected input port relative to the information characterizing at least one unselected input port continually after the first time period as long at the at least one selected input port is a selected input port.

26. The system of claim 18, wherein the source selection element is operable to reduce the influence of the information characterizing the at least one selected input port relative to the information characterizing at least one unselected input port is continually during a defined period after the first time period.

27. The system of claim 26, wherein the source selection element is operable to not further reduce the influence of the information characterizing the at least one selected input port relative to the information characterizing at least one unselected input port after the defined period.

28. The system of claim 18, wherein the source selection element is operable to reduce the influence of the information characterizing the at least one selected input port relative to the information characterizing at least one unselected input port for a defined period after the at least one selected input port becomes an unselected input port.

29. The system of claim 18, further comprising a video selection element operable to:
select at least one selected video input port from a plurality of video input ports associated with the plurality of input ports based on the information characterizing the audio sources and the weighting of the information characterizing at least one of the audio sources; and
provide at least one video signal from the at least one selected video input port to at least one video output for the conference call.

30. The system of claim 18, wherein the source selection element is operable to select sources and provide audio signals separately for each of a plurality of outputs so that different participants receive different selections of audio signals.

31. The system of claim 30, wherein the source selection element is operable such that each participant receives a selection of audio signals that does not include an audio signal from the source associated with that participant.

32. The system of claim 18, wherein the source selection element is operable, when a plurality of sources have been selected, to weight information characterizing the selected sources individually based on respective lengths of time for which each selected source has been selected.

* * * * *